(12) United States Patent
Leonard et al.

(10) Patent No.: US 12,614,026 B1
(45) Date of Patent: Apr. 28, 2026

(54) REFERENCE AND TRAINING DATA VALIDATION FOR MACHINE LEARNING MODELS

(71) Applicant: Amazon Technologies, Inc., Seattle, WA (US)

(72) Inventors: Anthony Edward Leonard, Round Rock, TX (US); Rohan Patil, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 18/478,787

(22) Filed: Sep. 29, 2023

(51) Int. Cl.
*G06F 40/20* (2020.01)

(52) U.S. Cl.
CPC .................................... *G06F 40/20* (2020.01)

(58) Field of Classification Search
CPC ...... G06F 40/20; G06F 40/242; G06F 40/279; G06F 40/44; G06F 40/47; G06F 40/51
See application file for complete search history.

(56) References Cited

U.S. PATENT DOCUMENTS

| | | | | |
|---|---|---|---|---|
| 2015/0195406 | A1* | 7/2015 | Dwyer | G10L 15/02 |
| | | | | 379/265.07 |
| 2020/0175961 | A1* | 6/2020 | Thomson | G10L 15/28 |
| 2021/0375261 | A1* | 12/2021 | Swvigaradoss | G06F 40/274 |
| 2024/0370660 | A1* | 11/2024 | Cha | G06T 11/00 |
| 2024/0378424 | A1* | 11/2024 | Bodigutla | G06N 3/08 |
| 2025/0005050 | A1* | 1/2025 | Krishnan | G06F 16/338 |
| 2025/0021842 | A1 | 1/2025 | Bernstein | |

| | | | | |
|---|---|---|---|---|
| 2025/0029110 | A1 | 1/2025 | Wooters | |
| 2025/0041717 | A1* | 2/2025 | Munjeti | A63F 13/67 |
| 2025/0061270 | A1* | 2/2025 | Wippich | G06F 40/166 |
| 2025/0077397 | A1* | 3/2025 | Sen | G06F 11/3692 |
| 2025/0077400 | A1 | 3/2025 | Sen | |
| 2025/0077682 | A1 | 3/2025 | Guttridge et al. | |
| 2025/0097171 | A1 | 3/2025 | Hu | |
| 2025/0103471 | A1 | 3/2025 | Bragaia | |
| 2025/0111239 | A1 | 4/2025 | Steenhoek et al. | |

OTHER PUBLICATIONS

U.S. Appl. No. 18/478,793, filed Sep. 29, 2023.
"Where We Go From Here with OpenAI's Mira Murati." YouTube, uploaded by a16z, Sep. 25, 2023. hhttps://www.youtube.com/clip/ UgkxE5kVGV5We4J_pjqoaumzeTc5KS4IxT3E.

* cited by examiner

*Primary Examiner* — Michael N Opsasnick
(74) *Attorney, Agent, or Firm* — Knobbe, Martens, Olson & Bear, LLP

(57) ABSTRACT

Systems and methods are provided for a prompt and content generation service to validate generated references and training data sets of large language models (LLMs). The prompt and content generation service may determine if a reference generated by an LLM is valid by searching a training dataset for tokens using a prompt, generated answer, and generated reference for content and references in the training data set. If the prompt and content generation service finds content or a valid reference with a certain confidence level, the prompt and content generation service may indicate that the generated content and reference is valid. The prompt and content generation service may additionally validate a saved checkpoint during training of an LLM by executing use case scenarios against the LLM checkpoint and determining if expected answers match generated answers.

19 Claims, 7 Drawing Sheets

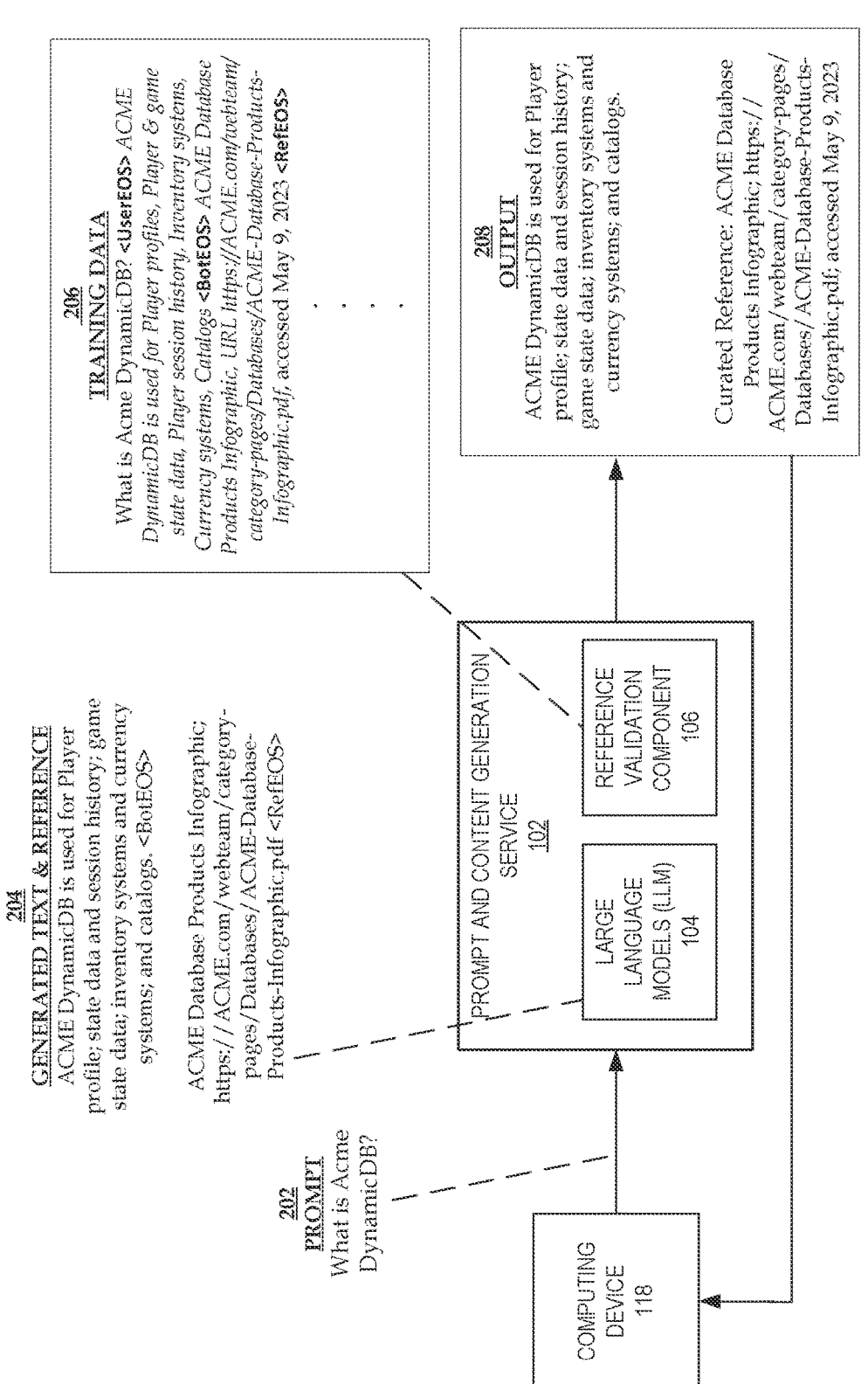

206
TRAINING DATA
What is Acme DynamicDB? <UserEOS> ACME DynamicDB is used for Player profiles, Player & game state data, Player session history, Inventory systems, Currency systems, Catalogs <BotEOS> ACME Database Products Infographic, URL https://ACME.com/webteam/category-pages/Databases/ACME-Database-Products-Infographic.pdf, accessed May 9, 2023 <RefEOS>

208
OUTPUT
ACME DynamicDB is used for Player profile; state data and session history; game state data; inventory systems and currency systems; and catalogs.

Curated Reference: ACME Database Products Infographic; https://ACME.com/webteam/category-pages/Databases/ACME-Database-Products-Infographic.pdf; accessed May 9, 2023

204
GENERATED TEXT & REFERENCE
ACME DynamicDB is used for Player profile; state data and session history; game state data; inventory systems and currency systems; and catalogs. <BotEOS>

ACME Database Products Infographic; https://ACME.com/webteam/category-pages/Databases/ACME-Database-Products-Infographic.pdf <RefEOS>

PROMPT AND CONTENT GENERATION SERVICE
102

REFERENCE VALIDATION COMPONENT
106

LARGE LANGUAGE MODELS (LLM)
104

202
PROMPT
What is Acme DynamicDB?

COMPUTING DEVICE
118

FIG. 2

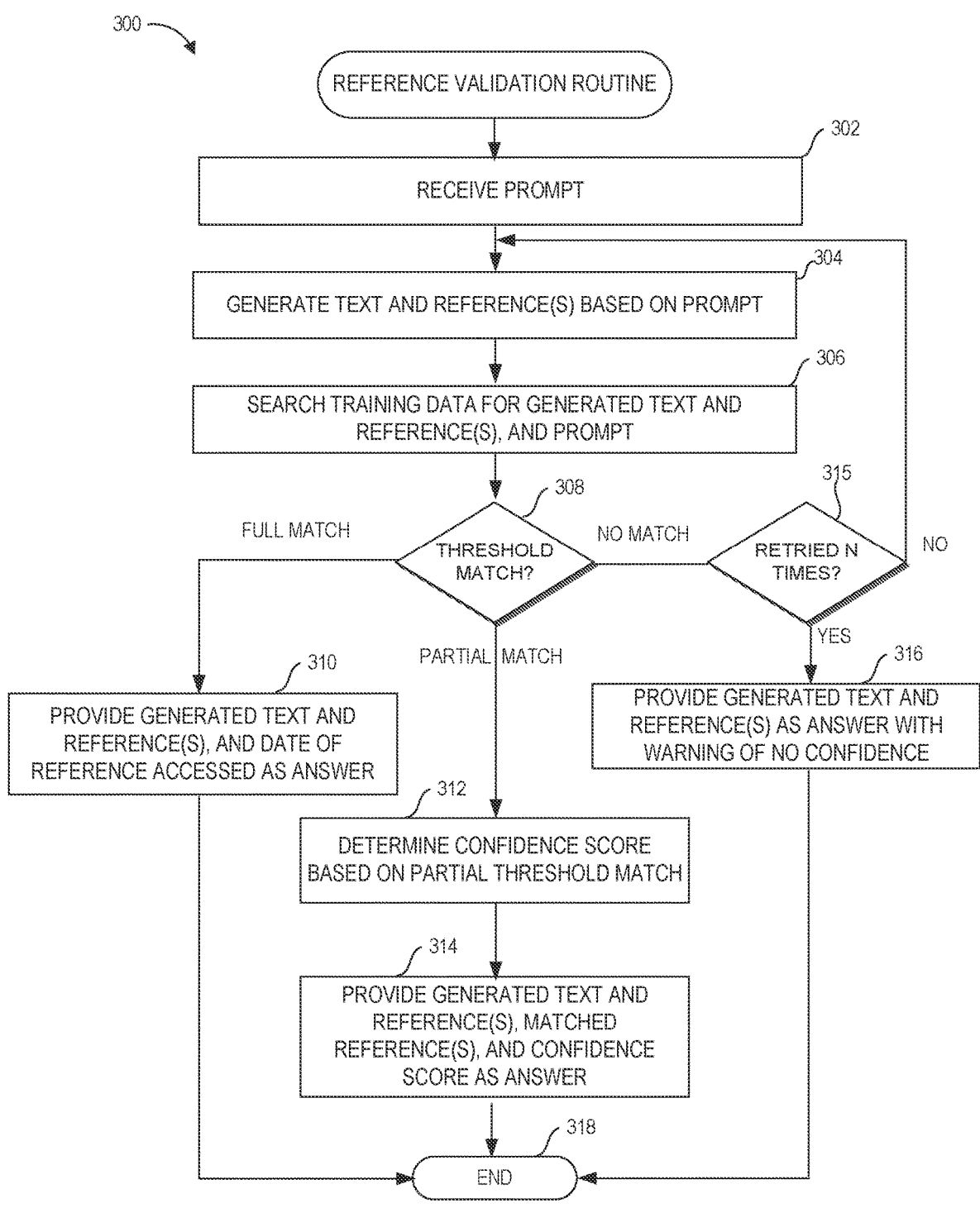

300

REFERENCE VALIDATION ROUTINE

302
RECEIVE PROMPT

304
GENERATE TEXT AND REFERENCE(S) BASED ON PROMPT

306
SEARCH TRAINING DATA FOR GENERATED TEXT AND REFERENCE(S), AND PROMPT

308
THRESHOLD MATCH?

FULL MATCH

NO MATCH

315
RETRIED N TIMES?

NO

YES

310
PROVIDE GENERATED TEXT AND REFERENCE(S), AND DATE OF REFERENCE ACCESSED AS ANSWER

PARTIAL MATCH

316
PROVIDE GENERATED TEXT AND REFERENCE(S) AS ANSWER WITH WARNING OF NO CONFIDENCE

312
DETERMINE CONFIDENCE SCORE BASED ON PARTIAL THRESHOLD MATCH

314
PROVIDE GENERATED TEXT AND REFERENCE(S), MATCHED REFERENCE(S), AND CONFIDENCE SCORE AS ANSWER

318
END

*FIG. 3*

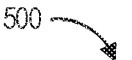

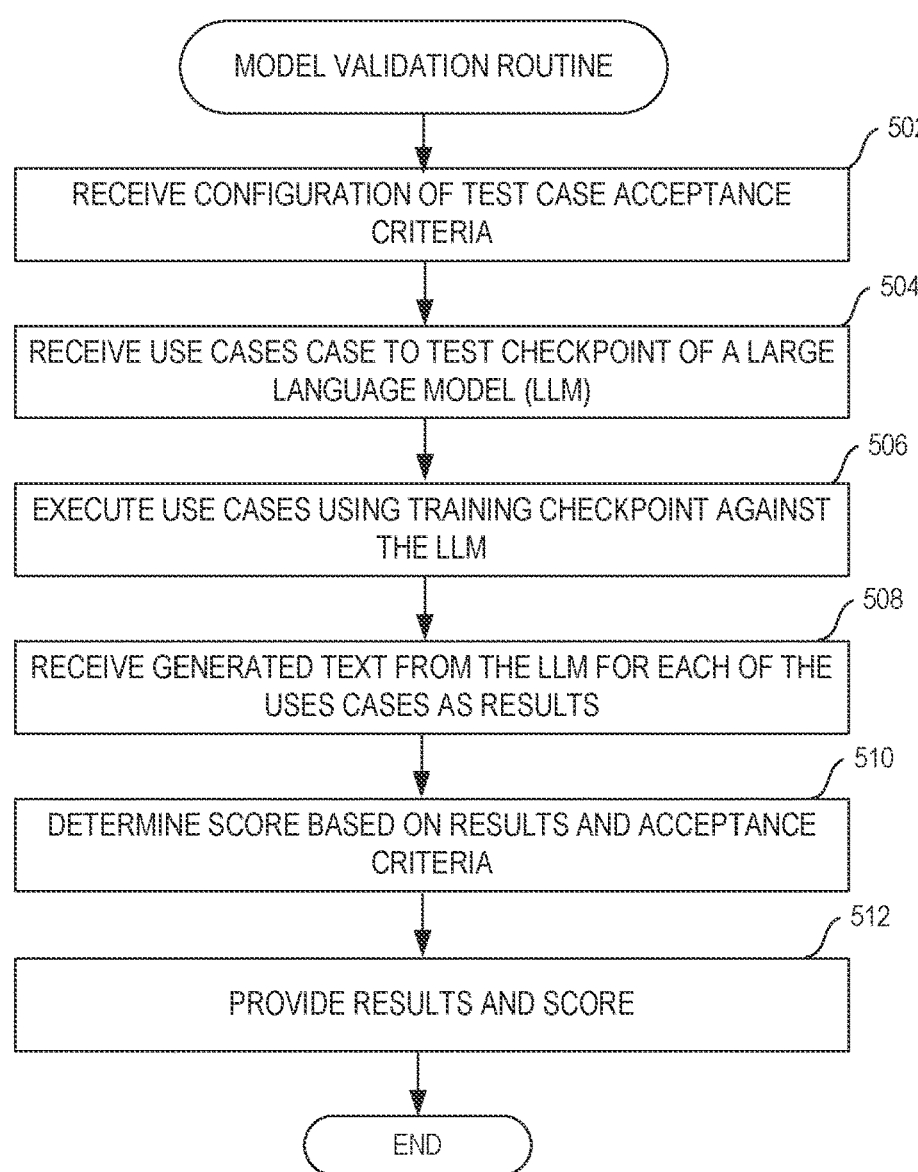

*500*

MODEL VALIDATION ROUTINE

502
RECEIVE CONFIGURATION OF TEST CASE ACCEPTANCE CRITERIA

504
RECEIVE USE CASES CASE TO TEST CHECKPOINT OF A LARGE LANGUAGE MODEL (LLM)

506
EXECUTE USE CASES USING TRAINING CHECKPOINT AGAINST THE LLM

508
RECEIVE GENERATED TEXT FROM THE LLM FOR EACH OF THE USES CASES AS RESULTS

510
DETERMINE SCORE BASED ON RESULTS AND ACCEPTANCE CRITERIA

512
PROVIDE RESULTS AND SCORE

END

*FIG. 5*

REFERENCE AND TRAINING DATA VALIDATION FOR MACHINE LEARNING MODELS

BACKGROUND

Generally described, computing devices and communication networks can be utilized to exchange data or information. In a common application, a computing device can request content from another computing device via the communication network. For example, a client having access to a computing device can utilize a software application to request content from a server computing device via the network (e.g., the Internet). In such embodiments, the client's computing device can be referred to as a client computing device, and the server computing device can be referred to as a content provider.

In some applications, the network service provider can instantiate various network-based services that can process client requests for data. For example, network-services related to query processing or question answering assistants (e.g., chatbots) can correspond to network-based services that interact with humans to provide information (e.g., information about a network-based service, how to use the network-based service, etc.).

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 2 is a visualization of the environment of FIG. 1 depicting illustrative interactions between the prompt and content generation service and a computing device for validating generated text and one or more generated references, in accordance with aspects of the present application;

FIG. 3 is a flow diagram illustrative of a routine for the prompt and content generation service validating generated text and one or more generated references, in accordance with aspects of the present application;

FIG. 5 is a flow diagram illustrative of a routine for the prompt and content generation service validating a saved training data set checkpoint of an LLM utilizing use cases, in accordance with aspects of the present application;

DETAILED DESCRIPTION

Figure 1:
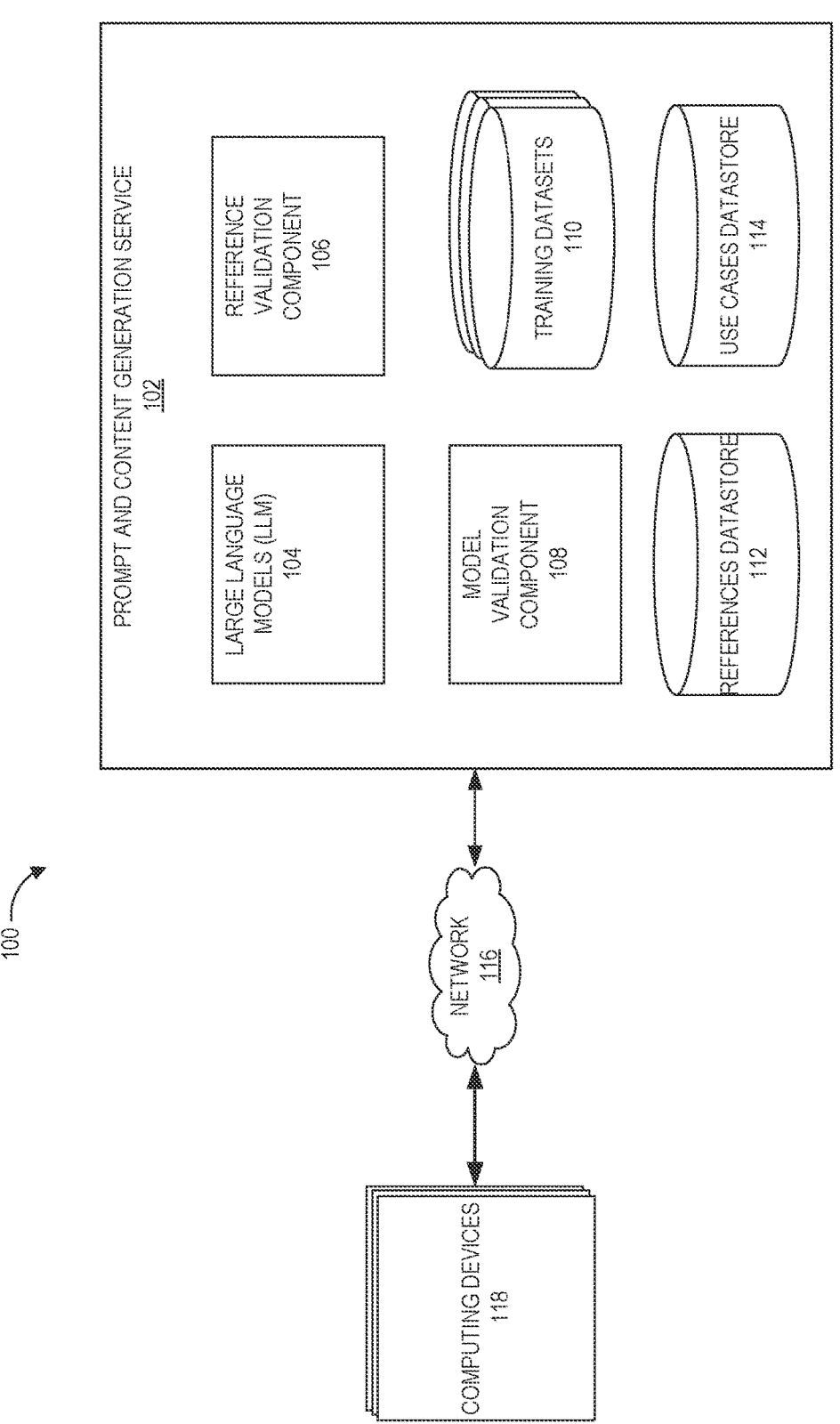
FIG. 1 depicts a block diagram of an environment for a prompt and content generation service that includes one or more computing devices, a prompt and content generation service including large language models, a reference validation component, and a model validation component, in accordance with aspects of the present application.

Generally described, aspects of the present disclosure relate to systems and methods for providing a prompt and content generation service incorporating one or more machine-learned algorithms configured according to large language models (LLMs), generally referred to as an "LLM." More specifically, one or more aspects of the present application can include the prompt and content generation service that can provide attribution data associated with one or more generated outputs provided by an LLM. Illustratively, the attribution data generated by the LLM can be based on tokens included in the training data utilized to configure the LLM. The attribution data can illustratively include additional reference information included in the generated outputs that provide additional information or context regarding portions of the training data that can be characterized as being the basis of the generated output.

Additionally, one or more aspects of the present application can include the prompt and content generation service validating the training of an LLM by executing one or more use case scenarios against the LLM and validating outputs generated by the LLM. Illustratively, the use case scenarios can include information related to expected outputs that can be matched to generated outputs from the LLMs (e.g., validating that a saved checkpoint of an LLM, trained with references, generates at least one of the references as expected output). Based on matching outputs from the LLMs (or degrees of matching), the use case scenarios can be utilized to characterize the appropriateness or correctness of the training of the LLM and the utility and value of the checkpoint LLMs. Illustratively, the matching of the outputs from the LLMs may be done at various time intervals or checkpoints, such as during the training of one or more LLMs using training data.

Generative artificial intelligence (AI) models (e.g., LLMs, implemented by prompt and content generation services or chatbots, etc.) are configured to generate outputs based on received prompts. For example, the prompts illustratively correspond to natural language queries provide via some form of interface associated with the LLM. Some implementations of LLMs may be limited to the generation of outputs provided by the LLM with no additional attribution data associated with the generated output. The lack of attribution data does not allow the recipient of the output (either a computing device/system or associated user) to understand one or more source content from the training set that formed the basis of the generated output. Additionally, the absence of the attribution data, or even some limited attribution data, does not allow for further processing to identify whether the generated output directly matches source content, a degree of matching or degree of extrapolation, or in some circumstances, a lack of attributable source content. For example, a well-known issue associated with LLMs is generally referred to as hallucinations and related to generated outputs that are not attributable to any source content utilized in training sets to configure a particular LLM. In some contexts, depending on the prompts submitted, such hallucinations can be particularly problematic especially when the prompt is expected to be based on source content that can be verified or validated independently.

In addition to the above deficiencies associated with limited or no attribution information for output generated by LLMs, developers and creators of LLMs often experience additional deficiencies associated with testing the validity of checkpoints created using training data sets. For example, these developers and creators may want to ensure that LLM outputs conform to specific requirements based on expected or required prompts. Illustratively, developers and creators (e.g., or LLM testers) may need to manually validate that a large number of prompts caused the LLM to generate the expected outputs. Further, variations as to prompts, sequence of prompts, or analysis of the generated answers can result in inconsistent testing and validation of LLM and LLM training.

Moreover, there have been attempts to resolve the lack of attribution data associated with generated outputs of LLMs. For example, some systems may have been designed to perform some form of post-generation attribution after generating output to a prompt. In this example, these systems may have used string-matching-based search techniques to compare LLM generated content to LLM training data. However, these techniques can be slow, costly, and inaccurate, because the nature of general string-matching technology can require complex matching logic to try to identify any similar content across a necessarily (e.g., for the LLM to work correctly) large training data set, and because the output of the LLM is meant to be newly generated content. Moreover, in some instances, the output may not be intended to match training data.

To address at least the above-described deficiencies, a prompt and content generation service can implement one or more modules to provide attribution data for validating generated references of LLMs. Specifically, according to one or more aspects, the prompt and content generation service can include attribution information that can be utilized to characterize the validity of outputs generated by an LLM utilized by the prompt and content generation service. Specifically, the attribution information can include the identification of source content from the LLM training set. The attribution information can further include additional information (e.g., contextual information) that illustratively identifies a degree of matching with source content, at least a portion of the underlying source content, additional related source content, and the like. In one example, the additional attribution information can be processed to identify whether the generated output is actually a replication or substantial replication of source content from the training set. In another example, the additional attribution information can be processed to identify whether the generated output is directly replicated from source content from the training set. Notably, depending on the prompt (and intended use of the output from the LLM), the attribution data and additional attribution data can be processed/interpreted differently. With reference to the above example, outputs matching source content (or substantially matching source content) may be undesirable in some application and highly desirable in other applications.

As described herein, the prompt and content generation service can utilize tokens to determine if one or more references generated by an LLM is associated with attribution data within a training set (e.g., validate the generated one or more references). For example, after an LLM generated text and an associated reference in response to a prompt, the prompt and content generation service may utilize the prompt, generated text and reference to search a training set (used to train the LLM) for tokens, and data associated with those tokens. In this example, the training data set may include a token for a predetermined/curated prompt (e.g., that can be matched to a real-time prompt by a user), a token for predetermined/curated output (e.g., that can be matched to real-time output generated by the LLM), and a token for one or more predetermined references (e.g., that can be matched to one or more references generated in real-time by the LLM). As described herein, predetermined/curated prompts, outputs, and references can refer to information within a training set that is vetted or otherwise validated.

Still in this example, after the LLM generated an output and one or more references based on the prompt, the prompt and content generation service can search the training set for tokens that match (e.g., to a certain threshold) the prompt, generated answer, or generated one or more references, or a combination thereof. Depending on a type of threshold match (e.g., full match, partial match, no match, etc.) the prompt and content generation service may provide at least a confidence score as to the validity of the generative reference (e.g., a full match would mean a generated reference is determined to be attributed to attribution data in a training set, whereas for a no match the prompt and content generation service cannot determine that the reference is associated with attribution data in the training set). Therefore, depending on the type of match, the prompt and content generation service may validate one or more generated references by finding matches in the training dataset. As such, the prompt and content generation service may use the tokens described herein to result in quicker, more efficient, and more accurate LLM output attribution.

Moreover, the prompt and content generation service can validate a saved checkpoint of an LLM by automatically executing one or more use case scenarios against the LLM, and determining whether expected output of the one or more use case scenarios match generated output by the LLM. As described herein, checkpoints of model weights may be saved as states of an LLM's training process. For example, during training of an LLM, checkpoints can correspond to triggering events/criteria for determining how the optimization of the LLM (e.g., updating or modifying weights associated with an LLM) correspond to expected outputs by the LLM. Specifically, at some point, continued training of an LLM (or application of training) could result in underfitting or overfitting an LLM. Creators, developers, and testers or LLMs can use checkpoints of model weights to resume training, or to load an LLM that has already been trained. Therefore, creators, developers, and testers of checkpoints can find them useful for debugging, or for saving a LLM's progress so that it can be resumed later. For example, the prompt and content generation service may utilize hundreds, if not thousands, of use case scenarios (e.g., in a script, stored in a datastore, etc.) where each use case scenario comprises a prompt, expected output, and what type of data value the expected output is. In this example, the prompt and content generation service can validate an expected output of different types (e.g., expected generated text, images, audio, video, etc.) against the generated answer and determine a threshold match of the expected answer to the generated answer.

The prompt and content generation service may determine (e.g., based on the threshold match between the expected output and the generated output) if a use case scenario passed. Still in this example, the prompt and content generation service may then aggregate all the outcomes (e.g., whether each use case scenario passed or failed) of each use case scenario and determine a total score for the one or more use case scenarios as a set (e.g., (i) percentage of use case scenarios that passed or was successful, (ii) yes/no values of whether each use case scenario passed or whether the aggregation of use case scenarios was considered as passing (as a set) or was successful (as a set), or (iii) success/failure values of whether each use case scenario passed or whether the aggregation of use case scenarios was considered as passing (as a set) or was successful (as a set)). The score and the results of each use case scenario may then be returned (e.g., in a report, on a dashboard, etc.). Therefore, developers, creators, or testers of LLMs need not be burdened with validating hundreds, if not thousands, of use case scenarios manually.

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Additionally, the examples are intended to be illustrative in nature and should not be construed as limiting.

FIG. 1 depicts a block diagram of an environment 100 for a prompt and content generation service. The environment 100 can include a network 116, the network connecting a number of computing devices 118 to a prompt and content generation service 102. Furthermore, the prompt and content generation service 102 can receive natural language prompts requesting some form of output. For example, the prompt and content generation service 102 can be configured to receive prompts from the computing devices 118 based on anticipated processing by one or more LLMs. Further, the prompt and content generation service 102 may be configured to focus on a training set, such as an LLM that has been specifically configured to provide select information (e.g., information from limited data sets). In other embodiments, the prompt and content generation service 102 can be configured with one or more LLMs that are not configured for specific information, type of information, etc., and may correspond to more general interfaces.

The prompt and content generation service 102 can use large language models (LLMs) 104 to generate output in response to prompts. Specifically, the LLMs 104 can be any trained machine learning model that utilizes deep learning algorithms to process and understand natural language queries or prompts and generates outputs (e.g., texts, images, audio, video, etc.). The LLMs 104 may be trained on a large corpus of data (e.g., the training datasets 110). Moreover, LLMs may be transformer-based networks or other self-attention based networks (e.g., an encoder-decoder transformer architecture or decoder-only transformer architecture). Specifically, LLMs 104 may be trained with tokens which identify predetermined/curated prompts, outputs (e.g., content), and one or more references which include or support the predetermined/curated outputs. Moreover, the LLMs 104 may process or compute an assortment of language tasks, such as translating languages, analyzing sentiments, chatbot conversations, and more. The LLMs 104 may process or compute conversational textual data, identify one or more entities and relationships between them, and generate new text that is coherent and grammatically accurate. As described herein, the prompt and content generation service 102 may utilize the LLMs 104 to process a prompt and generate an output with one or more references that include or support that generated output. Moreover, the generated one or more references may include attribution data to represent a set of information that accompanies the output. For example, attribution data may be a name of a reference (e.g., name of a website for a network-based service), a uniform resource locator (URL) of the reference (e.g., which a user who input the prompt can use to get to the reference on the Internet), and an access date the predetermined/curated one or more references was accessed.

The prompt and content generation service 102 can use the reference validation component 106 to validate whether generated output by an LLM corresponds to attribution data in a training set. Specifically, the reference validation component 106 can retrieve or receive the prompt, generated output, and one more references from the LLMs 104 and validate if the generated content and one or more references are associated with attribution data in a training set. For example, the reference validation component 106 may take any of the prompt, generated output, and one or more references and search a training set (e.g., one of the training data sets 110) used to train the LLM which generated the output. In this example, distinguished from other attribution methods, the reference validation component 106 may search the training set for labelled pre-determined/curated content and references as opposed to searching a training set that is not labelled in such a manner (e.g., where multiple words or phrases in a training set convey same or similar meaning making searching for content and references in the training set less performant). Still in this example, because the LLM was trained to output a pre-determined/labelled reference, the reference validation component 106 is expected to find an exact match within the training set for the pre-determined/labelled reference. However, this is in contrast to the design and operation of other LLMs, where the goal of those LLMs are to output new content that does not necessarily match data within a training set used to train those LLMs. As described herein, the reference validation component 106 may search the training set for tokens which identify source content and one or more references supporting that content. Moreover, there may be at least three types of tokens in the training data which identify a predetermined/curated prompt, output, or one or more references. In this example, the reference validation component 106 may perform the search and determine a threshold match (e.g., full, partial, no match, etc.). Based on the threshold match, the reference validation component 106 may then determine a level of confidence that the generated one or more references matches attribution data in a training set (e.g., the reference validation component 106 can determine without disclaimer that the generated reference fully matches to attribution data, or that the generated reference partially matches to attribution data, or that the generated reference cannot be matched to attribution data, etc.). Further, if the reference validation component 106 determines that the generated reference is associated with attribution data by finding such reference via a token, the reference validation component 106 may retrieve additional reference information from the reference datastore 112 (e.g., documentation, URL links, etc.) to be shared along with the generated output Therefore, the prompt and content generation service 102 may provide the generated output, one or more references (e.g., with name of reference, URL, date accessed, etc.), and a confidence level of whether the generated content and one or more references are associated with attribution data (e.g., including supplemental validated references information if applicable).

The prompt and content generation service 102 can cause the model validation component 108 to execute use case scenarios against an LLM and determine a result based on the execution of the use case scenarios. Specifically, the model validation component 108 can validate a training state that may be based upon timing or evaluation criteria generally defined as a checkpoint of an LLM (e.g., one of the LLMs 104) by executing one or more use case scenarios against the LLM. For example, the model validation component 108 may retrieve or receive one or more use case scenarios to execute against the LLM (e.g., from the use cases datastore 114). In this example, a use case scenario of the one or more use case scenarios may comprise a prompt to execute against the LLM (e.g., question regarding what network based database service is good for storing information regarding online gaming), an expected output (e.g., "Acme GameTech is a widely used network-based database for storing information regarding online gaming. Acme GameTech, URL https://ACME.com/gametech/databases/, accessed May 9, 2023"), and the type of expected output (e.g., generated text, URL reference, image, audio, video, etc.). In this example, the model validation component 108 may then execute each of the one or more use case scenarios against the LLM and determine whether they passed by performing a threshold match between the expected output and the generated output for each of the use case scenarios as results. The model validation component 108 may then aggregate the results and determine a score (e.g., a percentage of use case scenarios that passed). The prompt and content generation service 102 may share the results and score with a developer, creator, or tester of the LLM.

Moreover, the various aspects associated with the prompt and content generation service 102 can be implemented as one or more components that are associated with one or more functions, services, machine learning models, among other components. The components may correspond to software modules implemented or executed by one or more customer computing devices, which may be separate standalone customer computing devices. Accordingly, the components of the prompt and content generation service 102 should be considered as a logical representation of the service, not requiring any specific implementation on one or more customer computing devices. Moreover, the components, modules, functions, or services of the prompt and content generation service 102 may be implemented completely within the computing devices 118. For example, a user of a computing device 118 may utilize the components, modules, functions, or services, of the prompt and content generation service 102 completely within a computing environment of the computing device 118 (e.g., to perform reference validation of LLM generated output, model validation of an LLM checkpoint, etc.) in lieu of using the network 116 to communicate or connect to any outside service or system.

The Network 116, as depicted in FIG. 1, connects the devices and modules of the system. The network can connect any number of devices. The network 116 may be a personal area network, local area network, wide area network, over-the-air broadcast network (e.g., for radio or television), cable network, satellite network, cellular telephone network, or combination thereof. As a further example, the network 116 may be a publicly accessible network of linked networks, possibly operated by various distinct parties, such as the Internet. In some embodiments, the network 116 may be a private or semi-private network, such as a corporate or university intranet. The network 116 may include one or more wireless networks, such as a Global System for Mobile Communications (GSM) network, a Code Division Multiple Access (CDMA) network, a Long-Term Evolution (LTE) network, or any other type of wireless network. The network 116 can use protocols and components for communicating via the Internet or any of the other aforementioned types of networks. For example, the protocols used by the network 116 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some embodiments, the prompt and content generation service 102 generates processing results (e.g., outputs) in response to queries (e.g., question, prompt, command, etc.) submitted by computing devices 118 via the network 116. In other embodiments, the prompt and content generation service 102 retrieves passages from search systems of existing content residing on computing devices 118 or via the network 116 to provide outputs to prompts (e.g., which can be in a form of a natural language question, command, etc.). Illustratively, the prompt and content generation service 102 may utilize machine-learned algorithms, such as generative AI model algorithms, to provide outputs that are configured as inputs to additional network-based services or interfaces. For example, the outputs from the prompt and content generation service 102 could take the form of information regarding a specific network-based service, passages associated with a network-based service, links to webpages, application programming interface (API) calls, etc. submitted to a network-based service. By further way of example, the network-based services can include, but are not limited to, network-based computing resources, network-based ondemand code execution, network-based analytics, networkbased storage, network-based databases, network based artificial intelligence (AI), etc. The network-based service can also correspond to specific computer domains, such as websites dedicated to social media software for sharing pictures, websites dedicated to a retail service provider selling products and services, etc.

The computing devices 118 in FIG. 1 can connect to the prompt and content generation service 102 via the network 116 or the prompt and content generation service 102 can reside on the computing device 118. The computing devices 118 can send natural language questions or prompts (e.g., input from a user via a user interface (UI) of the computing devices 118) to the prompt and content generation service 102 and receive generated outputs from the prompt and content generation service 102 based on the natural language question or prompt. The computing devices 118 can be configured to have at least one processor. That processor can be in communication with the memory for maintaining computer-executable instructions. The computing devices 118 may be physical or virtual. The computing devices 118 may be mobile devices, personal computers, servers, or other types of devices. The computing devices 118 may have a display, speakers, or other output devices and input devices through which a user can interact with the user-interface component.

The training datasets 110 can comprise training data for the LLMs 104 with tokens to identify predetermined/curated prompts, outputs, and one or more references. As described herein, tokens may be a sequence of characters that represent meaningful units of text in a training set. These units may be a word, a punctuation mark, a number, or any other symbol. Furthermore, tokens may be obtained through a process called tokenization that can involve splitting text into individual tokens based on one or more predefined rules. For example, the training datasets 110 may comprise a specific token, or tokens, (e.g., <UserEOS>) that can be placed directly before, after, or a combination thereof, predetermined/curated prompt (e.g., "What is Acme DynamicDB? <UserEOS>", "<UserBOS> What is Acme DynamicDB?", "<UserBOS> What is Acme DynamicDB?<UserEOS>", etc.). Moreover, the training datasets 110 may comprise a specific token, or tokens, (e.g., <BotEOS>) that can be placed directly before, after, or a combination thereof, predetermined/curated output to a prompt (e.g., "ACME DynamicDB is used for Player profiles, Player & game state data . . . <BotEOS>", "<BotBOS>ACME DynamicDB is used for Player profiles, Player & game state data . . . ", "<BotBOS> ACME DynamicDB is used for Player profiles, Player & game state data . . . <BotEOS>", etc.). Furthermore, the training datasets 110 may comprise a specific token, or tokens, (e.g., <RefEOS>) that can be placed directly before, after, or a combination thereof, one or more predetermined/curated validated references that support or include the pre-generated output (e.g., "ACME Database Products Infographic, URL https://ACME.com/webteam/ category-pages/Databases/ACME-Database-Products-Info-graphic.pdf, accessed May 9, 2023 <RefEOS>", "<RefBOS>ACME Database Products Infographic, URL https://ACME.com/webteam/category-pages/Databases/ ACME-Database-Products-Infographic.pdf, accessed May 9, 2023". "<RefBOS>ACME Database Products Info-graphic, URL https://ACME.com/webteam/category-pages/ Databases/ACME-Database-Products-Infographic.pdf, accessed May 9, 2023<RefEOS>", etc.).

The references datastore 112 can store information regarding references. For example, the references datastore 112 may store supplemental reference information (e.g., documentation, URL links, any other informative information regarding references, etc.) that may accompany or supplement reference information tokenized in a trained data set (e.g., by the <RefEOS> token). In this example, the reference validation component 106, when returning a reference, may retrieve the supplemental reference information from the references datastore 112 in order to return it along with other information (e.g., generated output, references, or the training datasets 110 or references, etc.) the prompt and content generation service 102 may return as output to a prompt.

The use cases datastore 114 may store one or more use case scenarios that may be executed by the model validation component 108 against an LLM of the LLMs 104. For example, a set of one or more use case scenarios may be stored in the use cases datastore 114 under a designated name (e.g., a thousand use case scenarios stored under a designated name of "UseCase Set 1"). A developer, creator, or tester for the LLM may then utilize the data validation component 108 and execute use cases scenarios under the designated name (e.g., "UseCase Set 1") against the LLM. For example, a use case consisting of an expected user prompt and acceptable generated output is ("What is ACME-WS?", ["It is the world's most comprehensive and broadly adopted cloud", "ACME Web Services"]). For this example use case, "What is ACME-WS?" is the prompt and either "It is the world's most comprehensive and broadly adopted cloud" or "Web Services" are expected and acceptable generated outputs of an LLM.

FIG. 2 is a visualization of the environment of FIG. 1 depicting illustrative interactions between the prompt and content generation service 102 and a computing device 118 for validating one or more generated references (e.g., determining whether they are associated with attribution data in a training set), in accordance with aspects of the present application. The interactions begin at 202 when the computing device 118 (e.g., via a user of the computing device 118) submits a prompt (e.g., What is Acme DynamicDB?) to the prompt and content generation service 102. For example, a user of the computing device 118 may have input the prompt 202 via a user interface (UI) on the computing device 118 to be communicated to the prompt and content generation service 102.

At 204, the prompt and content generation service 102 receives the prompt and generates the generated text and reference using an LLM of the LLMs 204 (e.g., the generated text being "ACME DynamicDB is used for Player profile; state data and session history; game state data; inventory systems and currency systems; and catalogs. <BotEOS>" and the generated reference being "ACME Database Products Infographic; https://ACME.com/webt-eam/category-pages/Databases/ACME-Database-Products-Infographic.pdf<RefEOS>"). At this point, the prompt and content generation service 102 may not be able to determine whether the generated reference is associated with attribution data in the training set (e.g., validate the reference).

At 206, the prompt and content generation service 102 then utilizes the reference validation component 106 to determine if the generated text and reference (e.g., or multiple generated references) is associated with attribution data in the training set (e.g., the training datasets 110) by using the generated text and reference (e.g., and possibly also the prompt) to search the training data set (e.g., training dataset shown in FIG. 2) which the LLM was trained on. As described herein, the training data set which the LLM was trained on may contain tokens (e.g., <RefEOS>, <UserEOS>, <BotEOS>, etc.) that may have been curated or labelled to identify attribution data such as predetermined/ curated prompts, answers, and one or more references which support or include the generated output (e.g., as shown in training data). It should be noted that the training set (e.g., or any training data set used to train the LLMs 104) may have training data labelled with tokens and training data without tokens (e.g., data that is used to train an LLM but is not curated or labelled by a human to be output with accompanying one or more references). This is because curating and labelling training data with tokens may be time consuming and costly. However, it should be noted that use of tokens is not limited to the examples given (e.g., a token can identify an author of a reference, token can suggest code to be run for a specific prompt which asks for code to be run against a network-based service, etc.).

As described herein, the reference validation component 106 determines a characterization of matching between the generated text and reference (e.g., and possibly also the prompt) and the training set. The reference validation component 106 may determine a confidence level threshold based on the characterization of matching regarding whether the generated reference (e.g., or multiple generated references) is associated with attribution data in the training set. The reference validation component 106 may characterize the confidence level as, but is not limited to, a full match, partial match, or no match. For example, the reference validation component 106 may characterize the confidence level as a full match when the prompt, generated text and reference perfectly match to tokens for predetermined/curated prompts, outputs, and one or more references (e.g., every character in a given order matched for the prompt to the predetermined/curated prompt labelled by the predetermined/curated prompt token, generated text or answer to predetermined/curated output labelled by the predetermined/curated output token, and generated reference to a predetermined/curated reference labelled by the predetermined/curated reference token). In this example, the reference validation component 106 may programmatically instruct the prompt and content generation service 102 to, in response to the user's prompt, return the generated text, generated reference, and a message that indicates that the user's prompt, the text and reference generated by the LLM, perfectly match, character to character, to a predetermined/curated prompt, answer, and one or more references (e.g., labelled by tokens). Therefore, the reference validation component 106 may further indicate in the notification that the generated answer and reference as verified and attributed to data in the training set (e.g., because it was manually curated and confirmed by a person when creating the training data set).

In another example, the reference validation component 106 may also characterize the confidence level regarding a degree of matching of the generated output and one or more source content as full match when the generated text and reference perfectly match (e.g., confidence level may also be expressed as a percentage of matching or using categories (high, medium, low), etc.) to tokens for predetermined/curated output, and one or more references (e.g., every character in a given order matched for the generated text or answer to predetermined/curated output labelled by the predetermined/curated output token, and generated reference to a predetermined/curated validated reference labelled by the predetermined/curated reference token). In this example (e.g., which is different from above because the prompt 202 did not perfectly match to a prompt token but the generated output and reference perfectly matched to output tokens and reference tokens respectively), the reference validation component 106 may programmatically instruct the prompt and content generation service 102 to, in response to the user's prompt, return the generated text, generated reference, and a message that indicates that the text and reference generated by the LLM, perfectly match, character to character, to predetermined/curated output and one or more references (e.g., labelled by tokens). Therefore, the reference validation component 106 may further indicate in the notification that the generated output and reference are associated with attribution data in the training set (e.g., because it was manually curated and confirmed by a person or their trusted agent when creating the training data set).

In another example, the reference validation component 106 may characterize the confidence level as a partial match when the generated text and reference partly match to tokens for predetermined/curated output and more than one predetermined/curated reference (e.g., some characters in a given order matched for the generated text or answer to predetermined/curated output labelled by the predetermined/curated output token, and a generated reference partially matches to more than one predetermined/curated reference labelled by the predetermined/curated reference token). In other words, the reference validation component 106 may have searched the training set and found more than one reference (e.g., by matching some characters of the generated text and more than one reference predetermined/curated outputs and references using tokens) by way of a partial match. The reference validation component 106 may determine a specific confidence level based on the partial match for each of the more than one reference (e.g., because 60% of the characters matched for the first reference, the reference validation component 106 may indicate a 60% confidence level for the first reference, because 30% of the characters matched for the second reference, the reference validation component 106 may indicate a 30% confidence level for the second reference, etc.). In this example, due at least to the partial match, the reference validation component 106 may programmatically instruct the prompt and content generation service 102 to, in response to the user's prompt, to return the generated text, generated reference, the more than one predetermined/curated reference, and a message that indicates that the text and reference generated by the LLM, partly match, character to character, to predetermined/curated output and more than one predetermined/curated reference (e.g., labelled by tokens). Therefore, the reference validation component 106 may further indicate in the notification because that there was a partial match, that both the generated reference and the more than one predetermined/curated references should be shown, and that while predetermined/curated references are confirmed to have data set attribution (e.g., because they were manually curated and confirmed by a person or a trusted agent when creating the training data set), the generated reference may not have training data set attribution (e.g., an entry in the training data 206). Moreover, the reference validation component 106 may also share the confidence score in the notification for each of the references and rank them by their confidence level (e.g., show references with higher confidence levels before references with lower confidence levels). Additionally, it should be noted that the user may be able to manually set the confidence level threshold and ranking (e.g., ranking may not be based on percentage matching but based on subject matter such as ordering by a topic like databases before other matches topics).

In another example, the reference validation component 106 may characterize the confidence level as a partial match when the generated text and reference partly match to tokens for predetermined/curated output and one or more references (e.g., some characters in a given order matched for the generated text or output to pre-generated output labelled by the predetermined/curated output token, and generated reference to a predetermined/curated reference labelled by the predetermined/curated reference token). In other words, the reference validation component 106 may have searched the training data set and found at least one predetermined/curated reference (e.g., by matching some characters of the generated text and reference to predetermined/curated outputs and references using tokens) by way of a partial match. The reference validation component 106 may determine a specific confidence level based on the partial match (e.g., because 60% of the characters matched, the reference validation component 106 may indicate a 60% confidence level, because 30% of the characters matched, the reference validation component 106 may indicate a 30% confidence level, etc.). In this example, due at least to the partial match, the reference validation component 106 may programmatically instruct the prompt and content generation service 102 to, in response to the user's prompt, return the generated text, generated reference, the at least one validated predetermined reference, and a message that indicates that the text and reference generated by the LLM, partly match, character to character, to predetermined/curated output and one or more references (e.g., labelled by tokens). Therefore, the reference validation component 106 may further indicate in the notification that because there was a partial match, both the generated reference and the at least one reference is shown, and that while the at least one predetermined/curated reference is confirmed to be associated with attribution data (e.g., because it was manually curated and confirmed by a person or their trusted agent when creating the training data set), the generated reference may not be associated with attribution data. Moreover, the reference validation component 106 may also share the confidence score in the notification (e.g., that there was a 60% match between the generated output and reference with predetermined/curated output and at least one reference in the training data 206 and 110 from FIG. 1).

In another example, the reference validation component 106 may characterize the confidence level as no match when the prompt 202, generated text and reference 204 did not have any match to tokens for a predetermined/curated prompt, output, and one or more references (e.g., no characters in a given order matched for the generated text or answer to predetermined/curated output labelled by the predetermined/curated output token, and generated reference to a predetermined/curated reference labelled by the predetermined/curated reference token). In other words, the reference validation component 106 may have searched the training data 206 and found no reference (e.g., could not match any of the characters of the prompt 202, generated text and reference to predetermined/curated outputs and references using tokens) by way of a partial match. In this example, due at least to no match, the reference validation component 106 may programmatically instruct the prompt and content generation service 102 to, in response to the user's prompt, return the generated text, generated reference, and a message that indicates that the text and reference generated by the LLM did not match to predetermined/curated output and one or more references (e.g., labelled by tokens). Therefore, the reference validation component 106 may further indicate in the notification because there was no match, the generated text the generated reference is shown without a predetermined/curated reference or without an indication that the generated reference is associated with attribution data, and that the generated reference may not be associated with attribution data due to it not being found in the training data 206 (e.g., could be hallucinated).

Moreover, as described herein, the one or more references in the training data may be many types of references. For example, the reference may be a URL to a website which includes or supports the generated text. In another example, the reference may be audio which includes or supports the generated text. In another example, the reference may be an image which includes or supports the generated text. In another example, the reference may be video which includes or supports the generated text. It should be noted that the full match, partial match, and no match confidence level threshold may be set by a user of the computing devices 118 (e.g., user sets a full match to be an 80% character match instead of 100%, sets a no match characterization of 10%, etc.).

Still referring to FIG. 2, at 208, after the reference validation component 106 determines the characterization of matching, one or more references, and notification to be sent to the user. The prompt and content generation service 102 may send the optional generated text, optional generated reference, optional predetermined/curated text and one or more references, and notification to the user (e.g., as shown in the output). For example, the prompt and content generation service 102 may cause a UI on the computing device 118 to present the optional generated text, generated reference, optional predetermined/curated text and one or more references, and notifications (e.g., a notification array or object that shows various notifications like a notification that the text matched 100% but a reference did not match for example. Or 100% match of both text and reference. Or a 50% match of text and 100% reference match, etc.) to the user (e.g., as shown in answer 208). Moreover, depending on the characterization of matching, the prompt and content generation service 102 may cause the UI to present the optional generated text, generated reference, optional predetermined/curated text and one or more references. Additionally, the prompt and content generation services 102 may further cause the generation of notifications to the user in the form of different user interface objects, formatting, animations, colors and the like. In one example, the prompt and content generation services 102 can cause the generation of formatting attributes or visual indicators including colors, such as a full match in green as a first color, partial match in yellow as a second color, no match in red as a third color. In another example, the prompt and content generation services 102 can cause the generation of visual objects representative a degree of matching or a confidence factor in a characteristic of matching, such as Venn diagrams, Harvey ball indicators, hour-glass indicators, etc. The prompt and content generation services 102 can illustratively utilized various other graphical visual indicators of progress indicating the type of match, degree of confidence; etc.

FIG. 3 is a flow diagram illustrative of a routine for the prompt and content generation service 102 validating one or more generated references and outputs, in accordance with aspects of the present application.

At block 302, the prompt and content generation service 102 receives a prompt. A user of a computing device 118, using a UI of the computing device 118, may input the prompt as a natural language question, audio signal, sound, image, etc. into the UI. For example, the prompt and content generation service 102 may receive or retrieve the prompt (e.g., as a natural language question) from the computing device 118. The user of the computing device 118 may be a customer of a network-based service associated with the prompt and content generation service 102 or the prompt and content generation service 102 may reside on the computing device 118. Additionally, or alternatively, the prompt may be submitted or input via APIs. The prompt may also be generated by another generative model (e.g., not the LLMs 104) such that two models can effectively communicate with one another without human intervention. In this context, the user may seek a generated answer specifically related to the network-based service they have subscribed to. For example, the user may ask the prompt and content generation service 102 how to create a bucket in a network-based storage service. As another example, the user may ask the prompt and content generation service 102 to create an API call (e.g., the input is a prompt "please give me code to create a storage bucket named 'bucket3' in my network-based storage service").

At block 304, the prompt and content generation service 102 processes the prompt (e.g., supplements prompt with new information, validates it, formats it, etc.) and uses it to generate an output and one or more references via an LLM of the LLMs 104. As previously discussed, the LLM can generate an output based on applying the prompt (as processed). The output can include answers to natural language questions prompts, references (e.g., including URL, date accessed, and name of references), and the like.

At block 306, the prompt and content generation service 102 utilizes the reference validation component 106 to search training data utilized to train the LLM. Illustratively, the reference validation component 106 can provide additional attribution data to validate the generated one or more outputs, provide additional context of the generated outputs, identify confidence values regarding the similarity to the generated outputs and source content, and the like. As described herein, the training set can include tokens that identify different types of data within it (e.g., predetermined/curated prompts, answers, one or more references supporting or including the answers, etc.). As described herein, tokens may be a sequence of characters in a training data set that represents a meaningful unit of text, words, or phrases. The reference validation component 106 may take the prompt, generated output, and generated one or more references and perform a match characterization to predetermined/curated prompts, outputs, and one or more references within the training data that were tokenized.

By way of illustrative example, the reference validation component 106 may first process received prompts and search for a matching pre-generated prompt by searching prompt tokens. For example, the reference validation component 106 can search for attribution data associated with a <UserEOS> token. Moreover, reference validation component 106 may take the generated output and search for a matching predetermined/curated output by searching the predetermined/curated output token (e.g., data associated with a <BotEOS> token). Further, the reference validation component 106 can take the generated one or more references and search for matching predetermined/curated one or more references by searching reference tokens (e.g., data associated with a <RefEOS> token). The reference validation component 106 may characterize the match as either full, partial, or no match. For example, a full match characterization may be an exact character match of prompts, generated answers, or one or more references. In another example, a partial match characterization may mean that some character matchings of prompts, generated answers, or one or more references. In another example, a no match characterization may mean no character matchings of prompts, generated answers, or one or more references. It should be noted that the reference validation component 106 is not limited to matching by tokens. For example, the reference validation component 106 may search for attribution data in a training data set by matching to text or characters without use of tokens.

At decision block 308, the prompt and content generation service 102 utilizes the reference validation component 106 to take different actions based on the matching characterization. At block 310, if the reference validation component 106 determined that there was a full match, the reference validation component 106 may return the generated output, generated one or more references, predetermined/curated one or more references, and a notification to be sent to the user that input the prompt. As described herein, the notification may indicate that since there was a full match, the one or more generated references are validated to be associated with attribution data (e.g., because the one or more references were found in the training data and were curated and labelled by a person or trusted agent) and the reference validation component 106 may cause a UI of the computing devices 118 to show the generated one or more references and the predetermined/curated one or more reference such that the user has confidence in the generated one or more references (e.g., alternatively, the reference validation component 106 may show just the generated one or more references with a notification stating that the one or more references shown are associated with attribution data).

At block 312, if the reference validation component 106 determined that there was a partial match, the reference validation component 106 may determine a confidence score based on a threshold of the partial match. For example, the reference validation component 106 may determine that some of the characters of the prompt, generated output, and generated one or more references matched some of the characters of the pre-generated prompts, outputs, and one or more references, and determine a score (e.g., 60% of the characters matched). At block 314, the reference validation component 106 may return the generated output, generated one or more references, the partial matching predetermined/curated content and one or more references, and the confidence score with a notification that the one or more generated references may be valid because they partially matched with the shown predetermined/curated content and one or more references. Moreover, if the reference validation component 106 partially matched the generated one or more references to more than one predetermined/curated reference, the reference validation component 106 may rank the predetermined/curated references by certain criteria (e.g., ranking a pre-generated reference higher than another one because its partial match was higher (60% match ranked higher than a 30% match), ranking predetermined/curated validated references higher than others by topic, etc.).

As stated herein, regarding a full or partial match, the reference validation component 106 may supplement the predetermined/curated one or more references by retrieving data from the references datastore 112 (e.g., additional documentation regarding a predetermined/curated reference, image/video or audio regarding the pre-generated reference, etc.). As such, this supplemental information may be provided to the user in addition to the generated output and one or more references, the optional pre-generated one or more references, and the notification(s).

At decision block 315, if there was no match, the reference validation component 106 determines if it tried to determine a match n number of times (e.g., which could be a setting to retry for a match n (5, 7, 9, or 10, etc.) number of times) by restarting at block 304. For example, the reference validation component 106 may cause or instruct, at block 304, the LLMs 104 to generate new or different text and references different from a prior iteration. In this example, the different or newly generated text and references can be searched for within the training set for a match and confirm that such different or newly generated text and references are associated with attribution data.

At block 316, if the reference validation component 106 determined at decision block 315 that there was no match (e.g., after trying to find a match at block 304 for n times), the reference validation component 106 returns the generated output, generated one or more references and a notification that the generated one or more references could not be determined to be associated with attribution data of a training data set. For example, the notification may indicate that the user should manually validate the generated one or more reference and determine their validity (e.g., by searching for the generated one or more references on the internet), regenerate the response, or alter the prompt.

Figure 4:
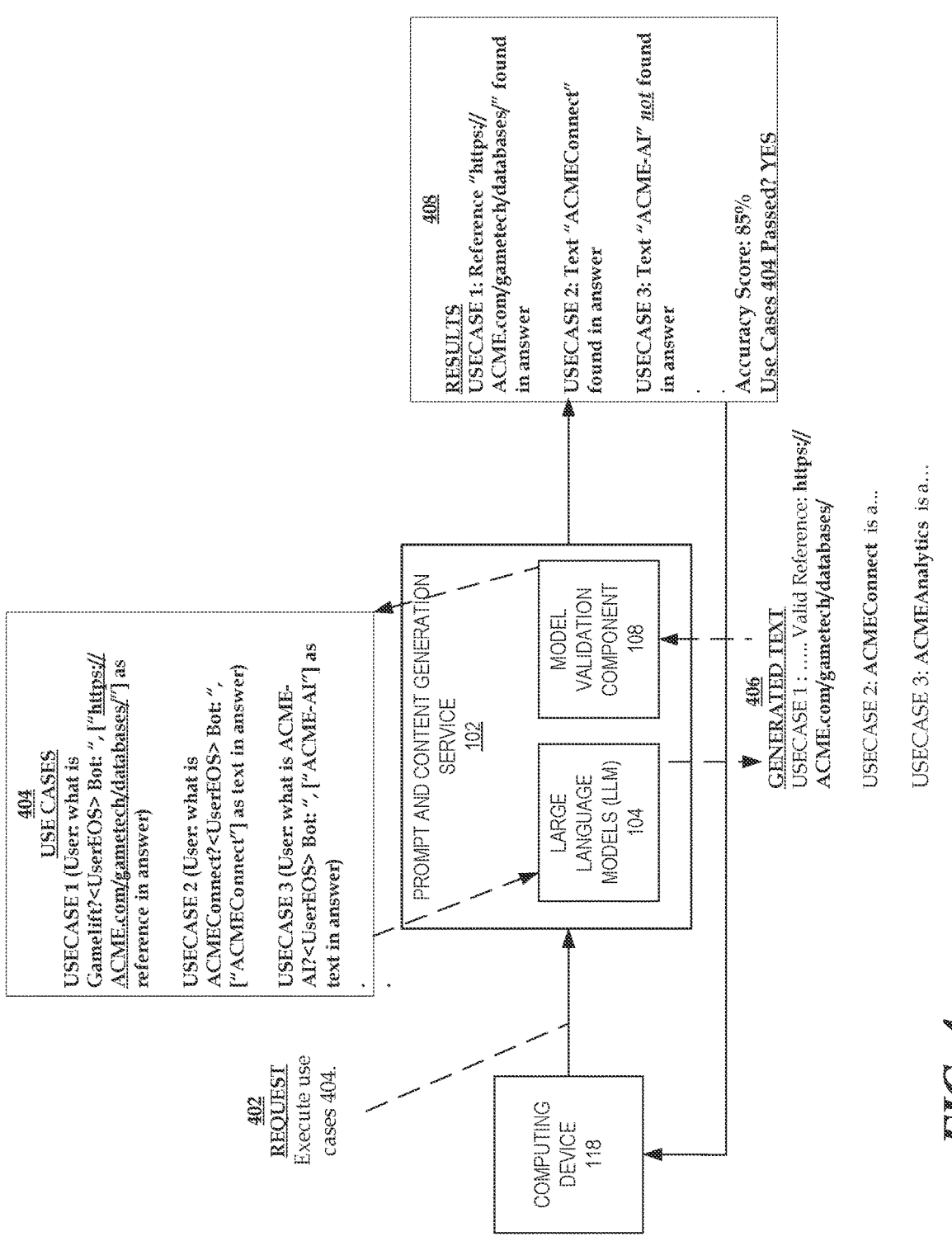
FIG. 4 is a visualization of the environment of FIG. 1 depicting illustrative interactions between the prompt and content generation service and a computing device that may validate a saved training data set checkpoint of a large language model (LLM) utilizing use cases, in accordance with aspects of the present application.

FIG. 4 is a visualization of the environment of FIG. 1 depicting illustrative interactions between the prompt and content generation service 102 and the computing device 118 for validating a saved checkpoint during training of an LLM utilizing use cases scenarios, in accordance with aspects of the present application. The interactions begin at 402, when the computing device 118 (e.g., as an LLM training computing device 118) submits a request (e.g., execute use cases 404) to the prompt and content generation service 102 to execute use case scenarios against an LLM checkpoint during training. For example, the computing device 118 inputs the request 402 via a function call to be communicated to the prompt and content generation service 102 using the saved checkpoint of the LLM.

Illustratively, use cases scenarios which can be executed against the LLM checkpoint during training may be saved or stored for on-demand automatic execution. For example, the prompt and content generation service 102 may store sets (e.g., each set of use case scenarios may be identified by a designated name like "use cases 404") of use case scenarios within a data store (e.g., the use cases datastore 114). Additionally, or alternatively, the prompt and content generation service 102 may retrieve use case scenarios to execute against LLM from other storage mediums (e.g., flash drive). Use case scenarios may be defined as a set of inputs in the form of one or more prompts to an LLM. The use case scenarios have expected output(s) (e.g., a single use case scenario may have more than one expected output) and tolerances associated with the outputs (optionally). Moreover, each of the use case scenarios themselves may include execution criteria (e.g., timing of when to execute the use case scenario against a checkpoint of an LLM during training, etc.).

The user of the computing device 118 may set or configure how a set of use case scenarios pass when executed against the LLM. For example, the user may set or configure a score based on a number of matches between a generated output and an expected output, for each of the one or more use case scenarios of a set (e.g., which should be met or surpassed for a set of use cases to be considered successful such as a requirement that at least 80% of the use case scenarios pass).

As shown in FIG. 4, when the user of the computing device 118 requests to execute use cases 404, the model validation component 108 may retrieve or receive the use case scenarios of use cases 404. For example, the model validation component 108 may retrieve the use cases 404 from the use cases datastore 114 or a flash drive or 108 may hard code the use cases as part of the model validation component 108. As illustratively shown in use cases 404, each use case scenario may comprise a prompt to be executed against the LLM (e.g., where the LLM was trained using pre-determined/curated content and pre-determined/curated references associated with the content), an expected output to the prompt, and the type of expected output (e.g., use case scenario USECASE 1 comprises a prompt of "what is AcmeGamelift?", an expected output should at least comprise "https://ACME.com/gametech/databases/", and the type of expected output to be a reference that includes or supports a generated output).

The model validation component 108 may store or cause a data store (e.g., use cases datastore 114) to store the type of expected output (e.g., group of characters or text, image file, audio file, video file). For example, if the expected output is a group of characters or text, the model validation component 108 may cause such data to be stored and then received or retrieved to be compared against a generated output by the LLM. In another example, if the expected output is an image file (e.g., picture of a famous building), the model validation component 108 may cause such data to be stored and then received or retrieved to be compared against a generated output (e.g., to ensure that the answer comprises of a picture of that famous building) by the LLM. In another example, if the expected output is an audio file (e.g., part of or all of a popular song), the model validation component 108 may cause such data to be stored and then received or retrieved to be compared against a generated output (e.g., to ensure that the output comprises of part of or all of the popular song) by the LLM. In another example, if the expected output is a video file (e.g., part of or all of a popular short video), the model validation component 108 may cause such data to be stored and then received or retrieved to be compared against a generated output (e.g., to ensure that the output comprises of part of or all of the popular short video) by the LLM.

Additionally or alternatively, in lieu of or in addition to an expected output of a use case scenario, the user may also configure a use case scenario to comprise an unexpected output. As used in this disclosure, the user may expect to not see the unexpected output in a generated output. In other words, if the user executes a use case scenario with an unexpected output (e.g., don't show me pictures of cars) against the LLM, and the LLM generates the unexpected output (e.g., the LLM generated an output which comprised pictures of cars), this use case scenario may be deemed a failure.

As shown in FIG. 4, at 406, after executing each use case in the set of use cases 404 against the LLM, the LLM generates content. The model validation component 108 then utilizes the generated content to determine if expected outputs for each of the use case scenarios were satisfied (e.g., for USECASE 1, did the expected answer include a reference of https://ACME.com/gametech/database/?). The model validation component 108 may perform a degree of matching (e.g., an exact match, a percentage match of over 50%, etc.) for each of the use case scenarios to determine a match between an expected output and a generated output and store or format each degree of matching as results of the execution. For example, a tester or developer may have trained the LLM with content (e.g., image, text, audio, video, etc.) and a reference that provides attribution to the content (e.g., a URL to a website which includes the content where the URL can be used to verify that the content exists on the website) by using the tokens described herein (e.g., a token used to identify the content and another token to identify the reference within the training data). In this example, to verify that a saved checkpoint of the LLM generates the content and reference together in response to a prompt, the tester or developer may create a use case scenario that includes the prompt and expected output where the expected output includes (i) the content and (ii) the expected reference. Moreover, in this example, the tester or developer may configure the model validation component 108 to deem the use case scenario a success only if executing the prompt against the saved checkpoint of the LLM causes the LLM to generate both the content and reference (e.g., the use case scenario would be deemed a failure if, in response to the prompt, the content is generated without the reference so there is not a full match of expected output to generated output). Additionally, still in this example, the model validation component 108 may be configured to stop a training process associated with the saved checkpoint of the LLM (e.g., to preserve computing resources such as memory), if the use case scenario fails to improve matching accuracy (e.g., between the generated output and the expected output) after a number of iterative executions against the saved checkpoint of the LLM.

Thereafter, the model validation component 108 may then aggregate the degree matches for each of the use case scenarios to determine a score for the set which comprised all the use case scenarios. As described herein, the model validation component 108 may determine the score as a percentage of use case scenarios that passed and whether the set of use case scenarios passed (e.g., where the pass rate may be based on configuration by the user, 60% of use case scenarios passing is considered a successful use case scenario execution). The model validation component 108 may cause the checkpoint LLM to be included in the set of the LLMs 104 that prompt and content generation service 102 uses to generate content to be shown (e.g., sent to the computing device 118 to be shown on a UI) report, interface, dashboard, or the like, similar to results shown at 408, where outcome of each use case scenario is shown, the score, and whether the set of use case scenarios passed (e.g., per the users settings or configurations). The model validation component 108 may cause checkpoint LLMs that fail use cases to be further trained, fine-tuned, deleted, discarded, or set aside for future training or investigation. Moreover, if successive or iterative executions of the use case scenarios of a saved checkpoint of the LLM do not produce a score that is greater than previous scores, the model validation component 108 may be configured to generate a notification indicating that the score has not improved and automatically stop the training process (e.g., to conserve computing resources or memory).

FIG. 5 is a flow diagram illustrative of a routine for the prompt and content generation service 102 validating outputs generated by the prompt and content generation service 102. Illustratively, routine 500 may be implemented to validate outputs generated by the prompt and content generation service 102 at various saved checkpoints, such as checkpoints during training of an LLM utilizing use cases scenarios, in accordance with aspects of the present application.

At block 502, the prompt and content generation service 102 or the model validation component 108 receives or retrieves configuration test case scenario criteria from a user of the computing device 118. For example, the user may configure when a set of use case scenarios pass (e.g., 60% of use case scenarios passing is considered a success). In another example, the user may configure when a single use case scenario passes (e.g., a single use case scenario passes when over 50% of the expected output is within the generated output). It should be noted that these configurations may be defaulted or embedded in all, or each, of the use case scenarios (e.g., default pass rate is 70% but such embedding may be modified).

At block 504, the prompt and content generation service 102 or the model validation component 108 receives or retrieves a set of use case scenarios to test against an LLM of the LLMs 104 (e.g., typically during training). As described herein, the language question answering service 102 or the model validation component 108 may retrieve or receive a set of use case scenarios from the use cases datastore 114.

At block 506, the prompt and content generation service 102 or the model validation component 108 executes the retrieved or received set of use case scenarios against the LLM. For example, each of the use case scenarios may comprise a prompt to be executed against the LLM.

At block 508, the prompt and content generation service 102 or the model validation component 108 may retrieve or receive generated outputs to each prompt of the use case scenarios. For example, the LLM may return each generated output and received prompt, as a pair, in order for the prompt and content generation service 102 or the model validation component 108 to perform matching analysis.

At block 510, the prompt and content generation service 102 or the model validation component 108 may determine a score based on the generated output to the expected outputs. For example, the prompt and content generation service 102 or the model validation component 108 may perform a degree of matching for every expected output and associated generated output (e.g., did they match and what kind of match was it?). Additionally, the prompt and content generation service 102 or the model validation component 108 may aggregate each degree of matching for every use case scenario and determine a score for the set comprising every use case scenario. Moreover, the prompt and content generation service 102 or the model validation component 108 may determine whether the set of use case scenarios was considered a success.

At block 512, the prompt and content generation service 102 or the model validation component 108 provide the use case scenario results, the score, and whether the set of use cases was considered a success, to the user or program. For example, the prompt and content generation service 102 or the model validation component 108 may cause a high scoring checkpoint to be saved as a best performing checkpoint which can be used for continued training, as a good candidate to fall back to if future checkpoints become corrupted, as a fine-tuning candidate, etc.

Figure 6A:
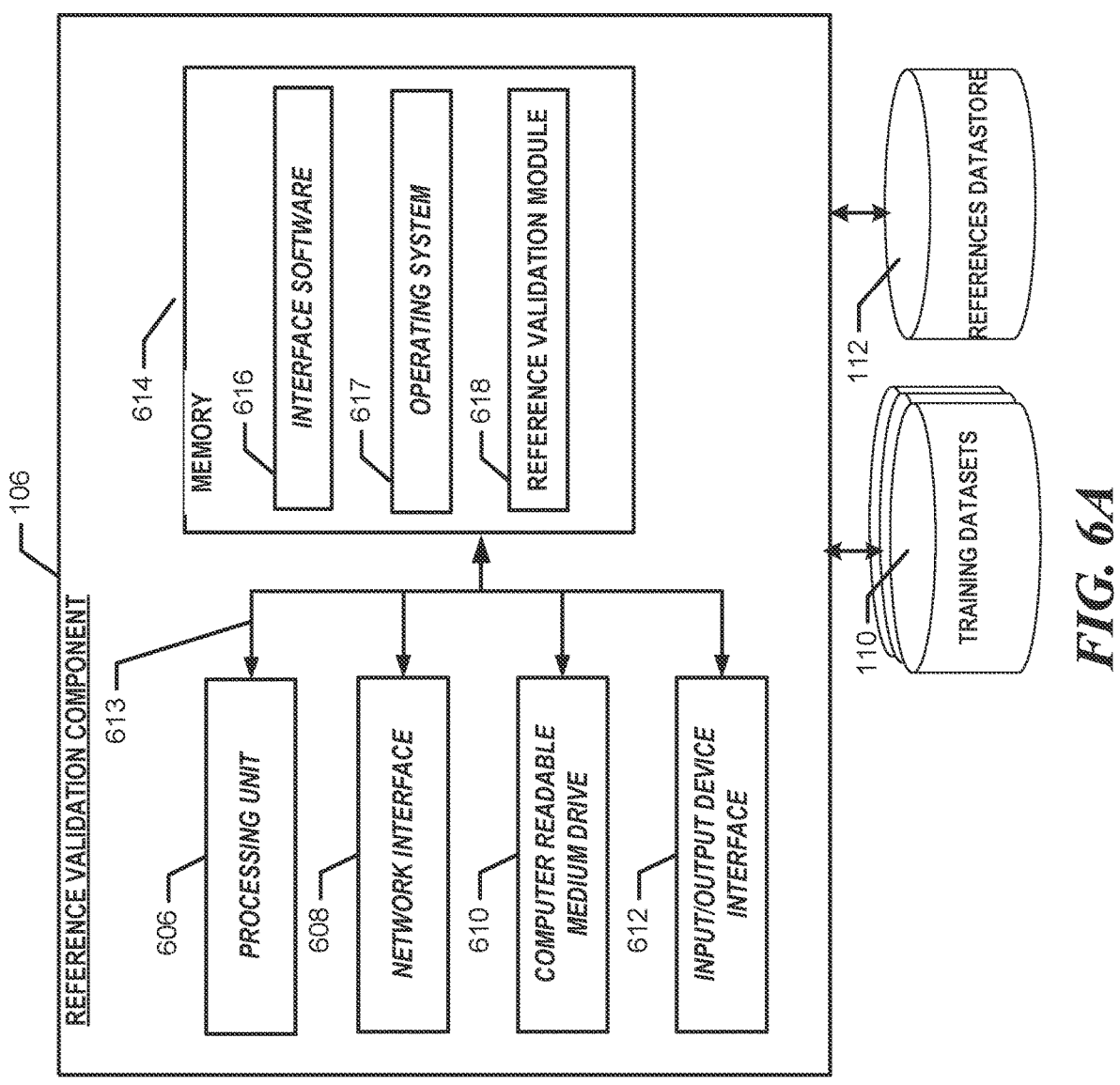
FIG. 6A is a block diagram of illustrative architecture of a reference validation component to validate one or more generated references, in accordance with aspects of the present application.

FIG. 6A depicts one embodiment of an architecture of an illustrative reference validation component 106 of the prompt and content generation service 102. As described herein, the reference validation component 106 can be configured to determine whether a generated reference by an LLM is validated as defined by being in the training datasets training datasets 110. As described herein, the reference validation component 106 may take a prompt, generated text, and generated reference and search a training data set for tokens in search of generated references to confirm that the generated reference is associated with attribution data.

The optional network interface 608 may provide connectivity to one or more networks or computing systems, such as the network 116 of FIG. 1. The processing unit 606 may thus receive information and instructions from local programs, other computing systems or services via a network. The processing unit 606 may also communicate to and from memory 614 and further provide output information for an optional display or output device like speakers (e.g., via a UI) via the input/output device interface 612. In some embodiments, the reference validation component 106 may include more (or fewer) components than those shown in FIG. 6A.

The memory 614 may include computer program instructions that the processing unit 606 executes in order to implement one or more embodiments. The memory 614 generally includes RAM, ROM, or other persistent or non-transitory memory. The memory 614 may store an operating system 617 that provides computer program instructions for use by the processing unit 606 in the general administration and operation of the reference validation component 106. The memory 614 may further include computer program instructions and other information for implementing aspects of the present disclosure. For example, in one embodiment, the memory 614 includes interface software 616 for communicating with other components and/or modules of the prompt and content generation service 102 to generate a prompt from passages and the natural language question.

Additionally, or alternatively, the reference validation component 106 may have access to training datasets 110. The reference validation component 106 may determine whether a generated reference and content from the one or more LLMs 104 is associated with attribution data 110. Moreover, the reference validation component 106 may have access to references datastore 112. The reference validation component 106 may retrieve or receive supplemental reference information for a validated reference in 110 from the references datastore 112.

Figure 6B:
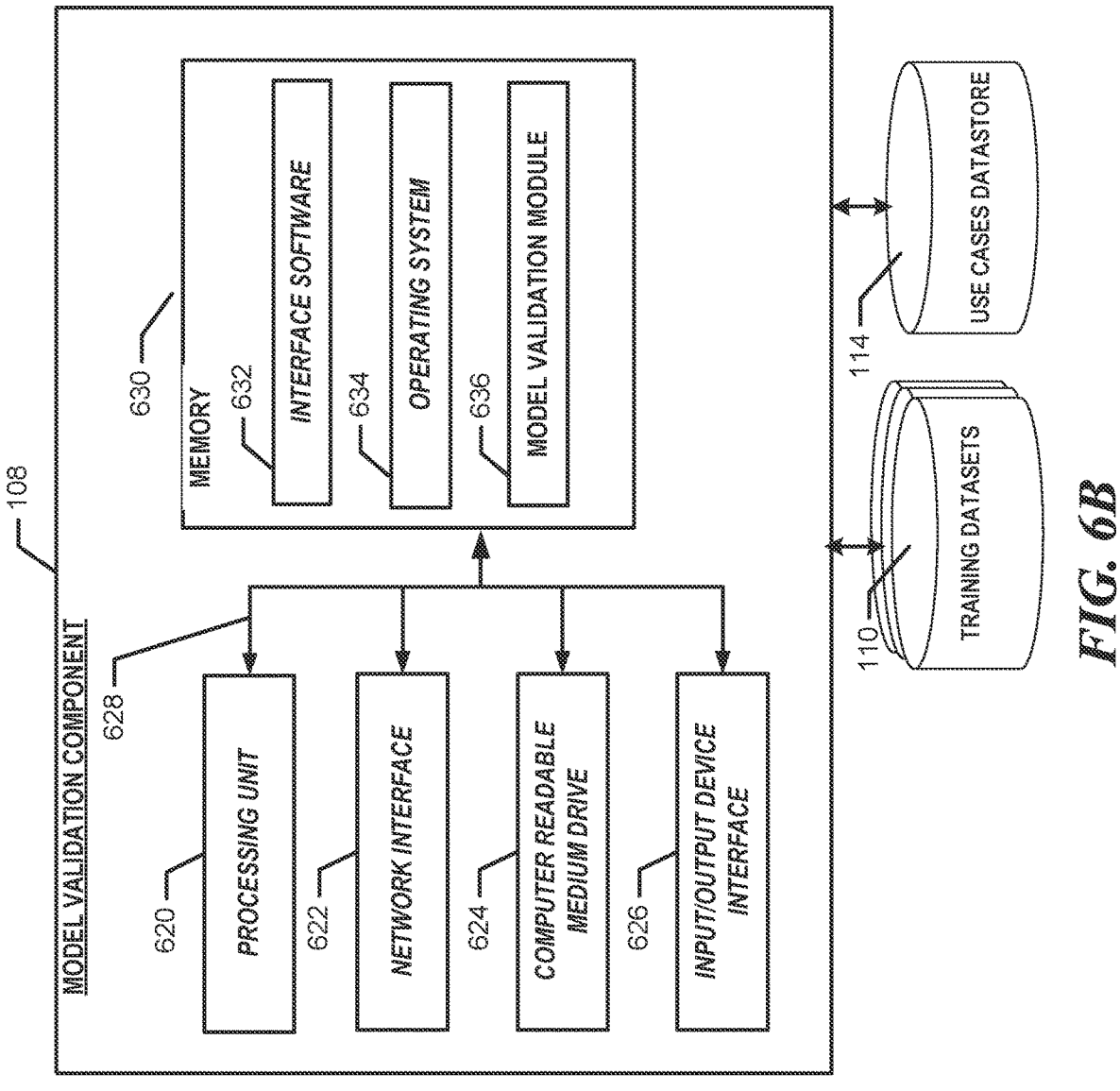
FIG. 6B is a block diagram of illustrative architecture of a model validation component to validate a saved checkpoint of an LLM utilizing use case scenarios, in accordance with aspects of the present application.

FIG. 6B depicts one embodiment of an architecture of an illustrative model validation component 108. The model validation component 108 can be configured to execute a set of use case scenarios against an LLM and determine whether the execution was a success. As described herein, the model validation component 108 may match expected output to generated output by the LLM and determine a degree of matching for each use case. Moreover, the model validation component 108 may then aggregate each of the degree of matches for each use case to determine whether the executed set of use cases was a success.

As illustrated, model validation component 108 includes a processing unit 620, an optional network interface 622, a computer-readable medium drive 624, and an input/output device interface 626, all of which may communicate with one another by way of a communication bus. The components of the model validation component 108 may be physical hardware components or implemented in a virtualized environment or in a distributed environment or all on a single physical compute device.

The optional network interface 622 may provide connectivity to one or more networks or computing systems, such as the network 116 of FIG. 1. The processing unit 620 may thus receive information and instructions from local software, other computing systems or services via a network. The processing unit 620 may also communicate to and from memory 630 and further provide output information for an optional display or output device via the input/output device interface 626. In some embodiments, the model validation component 108 may include more (or fewer) components than those shown in FIG. 6B.

The memory 630 may include computer program instructions that the processing unit 620 executes in order to implement one or more embodiments. The memory 630 generally includes RAM, ROM, or other persistent or non-transitory memory. The memory 630 may store an operating system 634 that provides computer program instructions for use by the processing unit 620 in the general administration and operation of the model validation component 108. The memory 630 may further include computer program instructions and other information for implementing aspects of the present disclosure. For example, in one embodiment, the memory 630 includes interface software 628 for communicating with other components or modules of the prompt and content generation service 102 to validate a saved checkpoint of an LLM being trained on one or more training datasets 110.

Additionally, or alternatively, the model validation component 108 may have access to training datasets 110. The model validation component 108 may utilize one or more of the LLMs 104 to execute use case scenarios of a set to determine whether that set can be deemed successful. Moreover, the model validation component 108 may have access to use cases datastore 114. The model validation component 108 may retrieve or receive use case scenarios from the use cases datastore 114 or have use cases as part of 636.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of customer computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable customer computing device, a device controller, or a computational engine within an appliance, to name a few.

Conditional language such as, among others, "can," "could," "might." or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without customer input or prompting, whether these features, elements and/or steps are included or are to be performed in any particular embodiment.

Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computing device for validating content and references generated by large language models (LLMs), the computing device comprising:
   computer-readable memory storing executable instructions; and
   at least one computing device in communication with the computer-readable memory and programmed by the executable instructions to:
      receive a prompt with a natural language question, image, or sound;
      generate, via an LLM, content and a reference in response to the prompt, wherein the LLM was trained using training data, and wherein the training data comprise content and predetermined references associated with the content;
      determine a characterization of matching by searching the training data to identify matches between the (i) content and the reference and (ii) the training data, wherein the characterization of matching comprises a full match, partial match, and no match; and
      if there was a full match:
         return the generated content and the reference, as an output to the prompt, wherein the output comprises a notification that the reference is associated with attribution data of the training data;
      if there was a partial match:
         determine a confidence score based on a degree of matching between the (i) content and the reference and (ii) the training data;
         return the content, the reference, and the confidence score as an output to the prompt, wherein the output comprises a notification that the reference was a partial match; and
      if there was no match:
         return the generated content and reference as an output to the prompt, wherein the output comprises a notification that the generated content and reference could not be determined to be associated with attribution data of the training data.

2. The computing device of claim 1, wherein the at least one computing device is further programmed by the executable instructions to:
   if there was no match:
      regenerate the content and reference up to a predetermined number of times until a full or partial match is found, wherein if a full match or partial match is found:
         return the regenerated content and reference as an output to the prompt, wherein the output comprises a notification that the reference was a partial match or full match.

3. The computing device of claim 1, wherein the predetermined references are identified by identifier tokens within the training data, and wherein an identifier token of the identifier tokens is positioned directly before, or directly after, a predetermined reference within the training data.

4. The computing device of claim 1, wherein the content is identified by identifier tokens within the training data, and wherein an identifier token of the identifier tokens is positioned directly before, or directly after, content within the training data.

5. A computer-implemented method comprising:
   receiving a prompt;
   causing generation, via a large language model (LLM), of output in response to the prompt;
   identifying, in the output, a first portion corresponding to content and a second portion corresponding to a reference;
   determining a degree of matching between the reference included within the output and one or more predetermined references included within training data for the LLM by searching the training data to identify a degree of matching between the reference included within the output and the one or more predetermined references included within the training data;
   generating attribution information indicating a confidence value for the output representing the degree of matching between the reference included within the output and one or more predetermined references included within training data for the LLM; and
   returning the output, including the content and the reference, with an indication of the attribution information indicating the confidence value for the output representing the degree of matching between the reference included within the output and one or more predetermined references included within training data for the LLM in response to the prompt.

6. The computer-implemented method of claim 5, wherein the matching is characterized as at least one of a full match, partial match, or no match.

7. The computer-implemented method of claim 5, wherein the generated attribution information is associated with a uniform resource locator (URL) of a website, and wherein the output is generated using content from the website.

8. The computer-implemented method of claim 5, wherein returning the output with the indication of the attribution information includes prior to returning the output, replacing at least a portion of the output with at least a portion of the training data based on a threshold matching.

9. The computer-implemented method of claim 5, wherein the degree of matching is determined based on a search for identifier tokens within the training data.

10. The computer-implemented method of claim 5, wherein the training data comprises content associated with identifier tokens and content not associated with identifier tokens.

11. The computer-implemented method of claim 5, wherein the content are identified by identifier tokens within the training data, and wherein an identifier token is positioned directly before or directly after content within the training data.

12. The computer-implemented method of claim 5, further comprising presenting the output on a user interface (UI), wherein different graphical visual indications on the user interface are based on a full match, partial match, or no match.

13. The computer-implemented method of claim 12, wherein the different graphical visual indications comprise a color attribute representative of a type of matching.

14. The computer-implemented method of claim 12, wherein the different graphical visual indications comprise a color attribute representative of a degree of matching.

15. One or more non-transitory computer-readable media storing specific computer-executable instructions that, when executed by a computing system comprising a processor, cause the computing system to at least:

identify, in an output from a large language model (LLM), a first portion corresponding to content and a second portion corresponding to a reference;

determine a degree of matching between the reference included within the output and one or more predetermined references included within training data for the LLM by searching the training data to identify a degree of matching between the reference included within the output and the one or more predetermined references included within the training data;

generate, attribution information indicating a confidence value for the output representing the degree of matching between the reference included within the output and one or more predetermined references included within training data for the LLM; and return the output, including the content and the reference, with an indication of the attribution information indicating the confidence value for the output representing the degree of matching between the reference included within the output and one or more predetermined references included within training data for the LLM.

16. The one or more non-transitory computer-readable media of claim 15, wherein the matching is characterized as at least one of a full match, partial match, or no match.

17. The one or more non-transitory computer-readable media of claim 15, wherein the attribution information comprises of (i) a uniform resource locator (URL) of a website containing content used to generate output and (ii) a date when the URL was accessed.

18. The one or more non-transitory computer-readable media of claim 15, wherein prior to returning the output, at least a portion of the output is replaced by the training data based on a threshold matching.

19. The one or more non-transitory computer-readable media of claim 15, wherein the output is matched to the one or more predetermined references included within the training data based on a search for identifier tokens within the training data.

* * * * *